United States Patent
Cuny et al.

(10) Patent No.: US 8,376,007 B2
(45) Date of Patent: Feb. 19, 2013

(54) STRUCTURE FOR TREAD PATTERN HAVING VOID RING, PEDESTAL AND CYLINDRICAL VOIDS

(75) Inventors: André Cuny, Habay La Neuve (BE); Frank Pierre Severens, Arlon (BE); Jean Joseph Victor Collette, Arlon (BE); Vincent Dominique Claude Rion, Aywaille (BE); Tibor Fülöp, Erpeldange (LU); Anne-France Gabrielle Jeanne-Marie Cambron, Mersch (LU); Jerome Marcel Germain Delu, Bridel (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 513 days.

(21) Appl. No.: 12/749,793

(22) Filed: Mar. 30, 2010

(65) Prior Publication Data
US 2011/0240192 A1 Oct. 6, 2011

(51) Int. Cl.
*B60C 11/117* (2006.01)
(52) U.S. Cl. .................... 152/209.17; 152/210
(58) Field of Classification Search ............ 152/209.17, 152/210; D12/508, 509, 540, 541, 575, 576
See application file for complete search history.

(56) References Cited

U.S. PATENT DOCUMENTS

| | | | | |
|---|---|---|---|---|
| 3,631,911 A * | 1/1972 | Verdier | .......................... | 152/210 |
| 4,221,254 A * | 9/1980 | Roberts et al. | ................ | 152/902 |
| 4,667,719 A * | 5/1987 | Masuda | .................... | 152/209.17 |
| 5,176,765 A | 1/1993 | Yamaguchi et al. | ...... | 152/209 R |
| 5,385,189 A | 1/1995 | Aoki et al. | ................. | 152/209 R |
| 5,785,782 A | 7/1998 | Tsuzuki et al. | ................ | 152/210 |
| 6,817,848 B2 | 11/2004 | Ishihara | ....................... | 425/28.1 |
| 7,267,148 B2 * | 9/2007 | Merino-Lopez et al. | | 152/209.17 |
| 7,306,019 B2 | 12/2007 | Kurokawa | .................. | 152/209.7 |
| 2006/0037683 A1 | 2/2006 | Cuny et al. | ................. | 152/154.2 |
| 2012/0024442 A1 * | 2/2012 | Narita et al. | ............. | 152/209.18 |

FOREIGN PATENT DOCUMENTS

| | | | |
|---|---|---|---|
| DE | 4426950 A1 | | 2/1996 |
| EP | 0664230 A2 | | 7/1995 |
| EP | 1066991 A2 | | 1/2001 |
| EP | 1630008 A1 | | 3/2006 |
| GB | 546975 A | * | 8/1942 |
| JP | 02-299910 A | * | 12/1990 |
| JP | 03-239606 A | * | 10/1991 |
| JP | 09-303365 A | * | 11/1997 |
| JP | 2005-262973 A | * | 9/2005 |
| JP | 2008-062749 A | * | 3/2008 |

OTHER PUBLICATIONS translation for Japan 03-239606 (no date).*
machine translation for Japan 2008-062749 (no date).*
machine translation for Japan 09-303365 (no date).*
machine translation for Japan 2005-262973 (no date).*
U.S. Appl. No. 12/629,364, filed Dec. 2, 2009, Andre Cuny, et al.

* cited by examiner

*Primary Examiner* — Steven D Maki
(74) *Attorney, Agent, or Firm* — Robert N. Lipcsik

(57) ABSTRACT

A structure for a tread pattern of a pneumatic tire includes a radially extending pedestal, a first set of cylindrical voids extending radially through the pedestal, a second set of cylindrical voids extending radially through the pedestal, and a radially extending void ring circumscribing the pedestal.

1 Claim, 4 Drawing Sheets

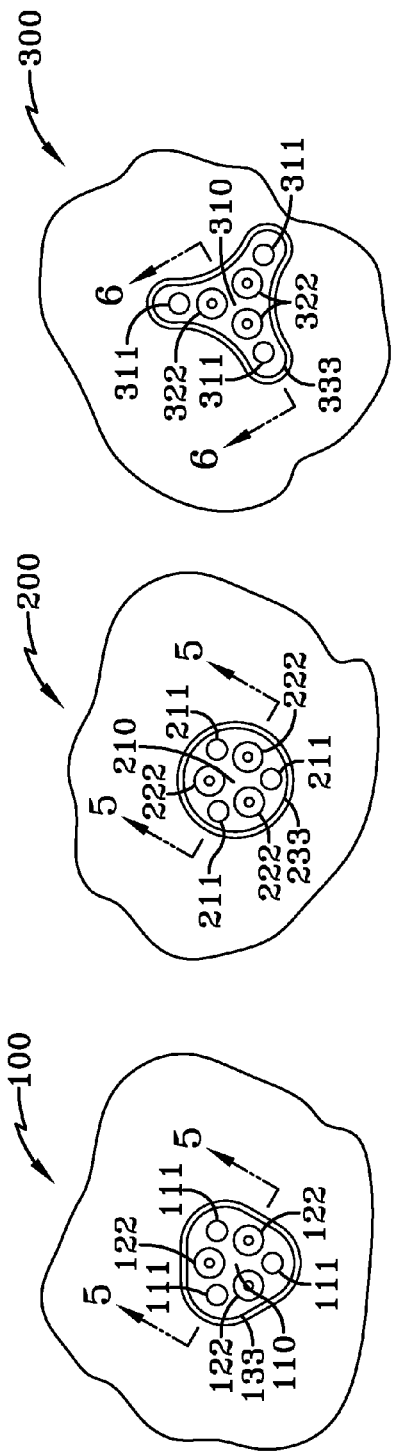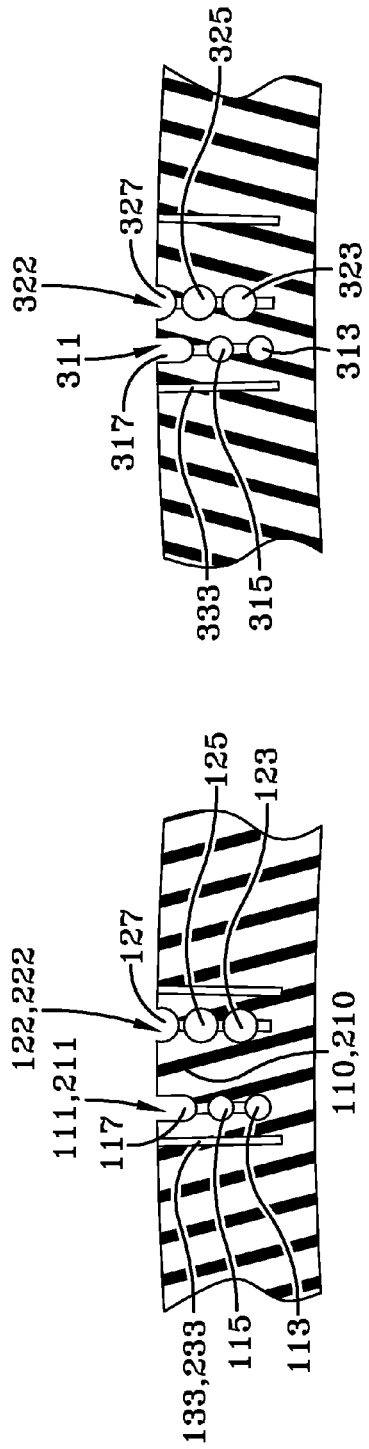

STRUCTURE FOR TREAD PATTERN HAVING VOID RING, PEDESTAL AND CYLINDRICAL VOIDS

FIELD OF INVENTION

The present invention relates to a pneumatic tire having a tread pattern, and more particularly, a pneumatic tire having blocks and constructions in the blocks for improving traction of the tread.

BACKGROUND OF THE INVENTION

A conventional pneumatic tire may have sipes in tread blocks so that the running performance of the tire improves on ice- or snow-covered roads due to the edges of the sipes (known as a studless tire). The studless tire may be used on vehicles which run on ice- or snow-covered roads.

Because groove width of a sipe is narrow, when the sipe opens, it is easy for stress to concentrate on the bottom portion of the sipe. It is therefore easy for cracks to form from the bottom portion of the sipe. In order to combat this drawback, an enlarged portion, having a circular cross-sectional configuration, at the bottom portion of a sipe may be formed. However, when two sipes are disposed so as to be adjacent to each other, if an interval between enlarged portions is too narrow, the rubber, which should be between the sipes, may be caught and remain between blades of a vulcanization mold. Further, the rigidity of the narrow area between the sipes may decrease and the amount of shearing deformation, when the pneumatic tire is subject to a front-to-back force during running, may increase. Thus, cracks may form at the bottom portion of the sipe.

Conventional blocks may have at least two sipes. When side force is applied to narrow areas due to cornering or the like, distortion due to shearing occurs, and cracks form in the bottoms of the sipes. If the cracks worsen, depending on the case, the narrow areas may break off.

However, when a side force occurs during running, such as that described above, and acts upon tires having a variety of configurations for blocks having sipes, the bottom portion of the narrow area may be deformed by shearing force in the transverse direction. Again, cracks are generated, and, depending on the case, the narrow area may break off.

When the above-described blocks are disposed on a pneumatic tire tread such that the narrow areas are arranged in a row along the transverse direction of the tire, areas having low rigidity are conventionally arranged so as to coincide along the transverse direction of the tire. When a side force is applied to the pneumatic tire, the deformation of the narrow areas may be large and cracks may form in the narrow areas and the narrow areas may break off.

Usually, concave portions for forming blocks are provided in a vulcanization mold for vulcanizing a block tire. After an unvulcanized green tire is placed in the vulcanization mold, the green tire is pressurized to a predetermined pressure and heated to a predetermined temperature. Due to this process, the rubber of the green tire is pressed tightly into the concave portions so that the outer contour is formed and vulcanization is effected.

When internal pressure is applied to the green tire and rubber of the green tire is forced into a concave portion of the mold, the concave portion is closed by the rubber and air and gas generated by the rubber stagnate so that the rubber cannot flow. In order to prevent such a situation from occurring, vent holes, which communicate with the outside air, may be provided in vicinities of the four corners of the concave portion so that the air within the cavities may escape and the rubber may flow more easily. When a pair of sipes is provided so that the block is divided into three areas, it may be necessary to form a pair of thin, plate-shaped blades, which extend from one wall surface of the mold to the opposing wall surface, within the concave portion. The concave portion may be divided into three areas by the pair of blades so that a small concave portion may be formed between the pair of blades. When the rubber of the green tire flows into the concave portion, there is no place within the small convex portion for the air to escape so that the small concave portion may be closed by the rubber. Therefore, the rubber does not flow to the bottom portion of the small concave portion, and bare areas exist in the block after vulcanization.

In order to eliminate this drawback, one conventional method forms a pneumatic tire by using a vulcanization mold in which through-holes are provided so that the small concave portion and end concave portions, which are adjacent to the small concave portion, communicate via the through-holes. However, this structure does not sufficiently allow the air inside the small concave portion to escape, and consequently does not sufficiently prevent the formation of bare areas.

A conventional pneumatic tire, as the tire becomes worn, may prevent the protruding of a narrow area interposed between sipes so that the on-ice running performance of the tire does not deteriorate. The conventional tire may have blocks with at least one pair of sipes and which may reliably and easily be removed from a mold for vulcanization. The tire may have blocks with at least one pair of sipes in which the generation of cracks at bottom portions of the sipes may be prevented. The tire may further have a block pattern capable of preventing the formation of cracks in a narrow area defined by a pair of sipes and the breaking off of portions of blocks. A mold for vulcanization of the conventional tire may prevent the formation of bare areas in a narrow area when the pneumatic tire is manufactured.

The conventional pneumatic tire may comprise a plurality of blocks, each having a narrow area interposed between one set of two sipes which extend substantially in a transverse direction of the tire and wide areas positioned respectively at both sides of the narrow area across the sipes. As the tire contacts the ground during rotation, due to the difference between the distance from the center of rotation of the tire to the tread surface of the narrow area and the distance from the center of rotation of the tire to the tread surface of the wide area, the narrow area may intermittently slidingly contact the road surface and not contact the road surface. Thus, the narrow area may wear more quickly than the wide areas due to the narrow areas slidingly contacting the road surface. Therefore, the narrow area does not protrude compared with the wide areas. The rigidity of the narrow area may not be as small as that of the wide area.

Another conventional pneumatic tire may comprise a plurality of blocks, each having a narrow area interposed between one set of two sipes which extend substantially in a transverse direction of the tire and wide areas positioned respectively at both sides of the narrow area across the sipes, expanded portions being formed respectively at bottom portions of the sipes. By providing the expanded portions at the bottom portions of the sipes, the stress applied to the bottom portions when the sipes open may be dispersed, and the formation of cracks from the bottom portions may be prevented. Therefore, when the pneumatic tire is removed from the vulcanization mold used to form the pneumatic tire, the narrow area is not caught and does not remain between blades of the vulcanization mold which are used to form the sipes.

SUMMARY OF INVENTION

A structure for a tread pattern of a pneumatic tire in accordance with the present invention includes a radially extending pedestal, a first set of cylindrical voids extending radially through the pedestal, a second set of cylindrical voids extending radially through the pedestal, and a radially extending void ring circumscribing the pedestal.

In accordance with another aspect of the present invention, the pedestal has a rounded-off triangular shape.

In accordance with still another aspect of the present invention, the pedestal has a circular shape.

In accordance with yet another aspect of the present invention, the pedestal has a rounded-off three-pronged shape.

In accordance with still another aspect of the present invention, the first set includes three cylindrical voids.

In accordance with yet another aspect of the present invention, the second set includes three cylindrical voids.

In accordance with still another aspect of the present invention, the first set of cylindrical voids each have a first spherical expansion at the radially innermost portion of the cylindrical void and a second spherical expansion interposed between the first spherical expansion and the radially outermost portion of the cylindrical void.

In accordance with yet another aspect of the present invention, the radially outermost portion of each of the first set of cylindrical voids is defined by a partially spherical expansion.

In accordance with still another aspect of the present invention, the second set of cylindrical voids each have a first spherical expansion disposed radially away from a radially inner end of the cylindrical void and a second spherical expansion interposed between the first spherical expansion and the radially outermost portion of the cylindrical void.

In accordance with yet another aspect of the present invention, the radially outermost portion of each of the second set of cylindrical voids is defined by a partially spherical expansion.

In accordance with still another aspect of the present invention, the pedestal is radially compressed against a road surface and an ice layer during rotation of the pneumatic tire.

In accordance with yet another aspect of the present invention, the pedestal is deformed to extend beyond a main tread surface of the pneumatic tire.

In accordance with still another aspect of the present invention, biting edges of the pedestal enhance snow traction of the pneumatic tire.

In accordance with yet another aspect of the present invention, the structures create suction against an ice surface for enhancing ice traction.

In accordance with still another aspect of the present invention, a portion of snow is ejected by the elastic expansion of the pedestal.

BRIEF DESCRIPTION OF THE DRAWINGS

The invention will be described by way of example and with reference to the accompanying drawings in which:

FIG. 2 is a schematic top view of one example structure for use in the tread pattern of FIG. 1 in accordance with the present invention.

FIG. 3 is a schematic top view of another example structure for use in the tread pattern of FIG. 1 in accordance with the present invention.

FIG. 4 is a schematic top view of another example structure for use in the tread pattern of FIG. 1 in accordance with the present invention.

FIG. 5 is a schematic section view taken along lines 5-5 in FIG. 2 or FIG. 3.

FIG. 6 is a schematic section view taken along lines 6-6 in FIG. 4.

DESCRIPTION OF EXAMPLE EMBODIMENTS OF PRESENT INVENTION

Figure 1:
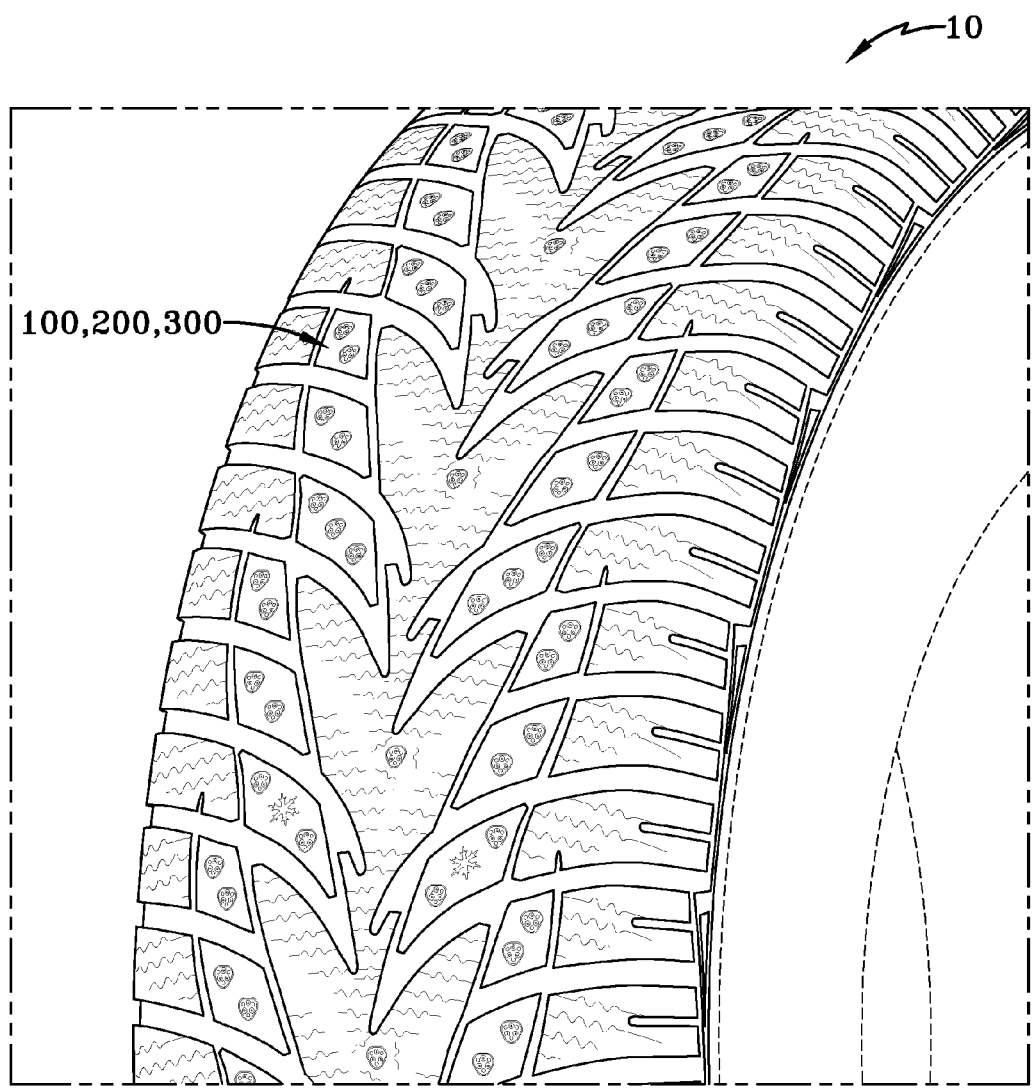
FIG. 1 is a schematic perspective view illustrating a portion of a tread pattern of a pneumatic tire having structures in accordance with the present invention.
Figure 7:
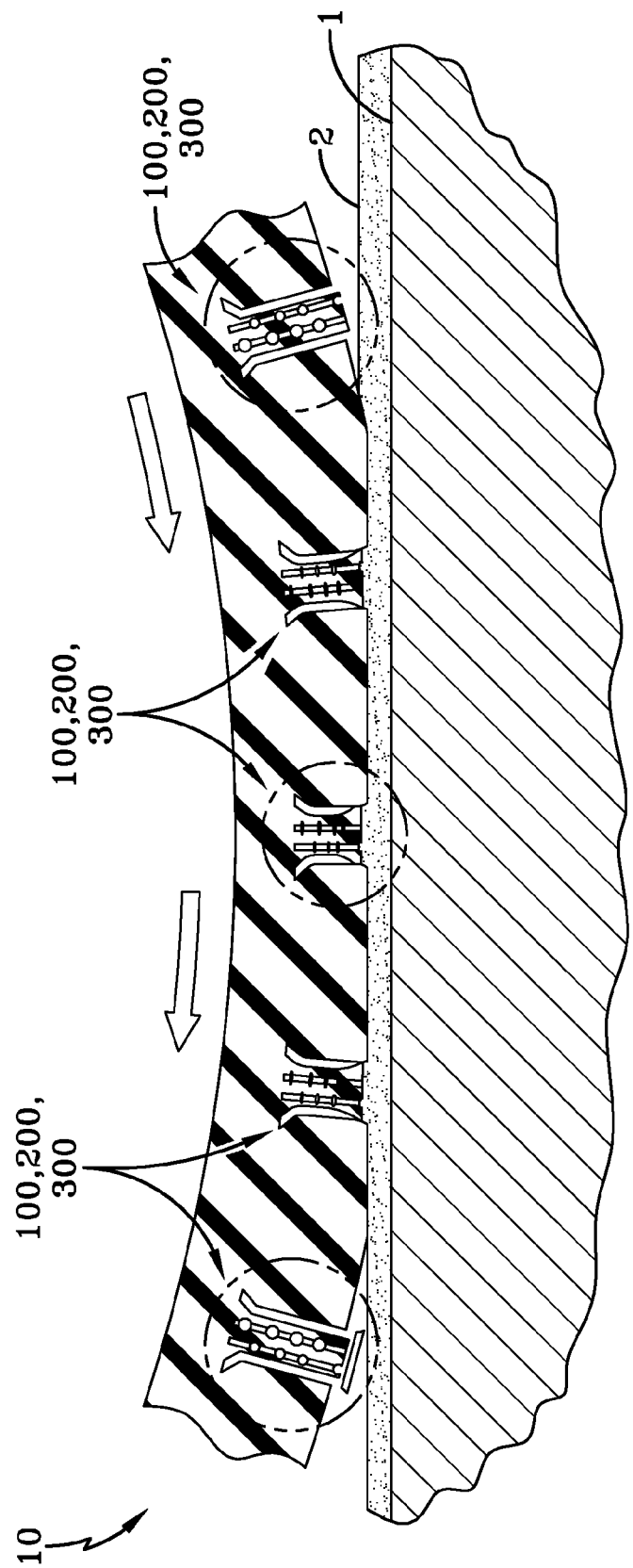
FIG. 7 is a schematic side view of the tread pattern of FIG. 1 under an operating condition.

A pneumatic tire in accordance with the present invention has a tread pattern 10, a portion of which is illustrated in FIG. 1. FIG. 2 is a radial top view of an example structure 100 in the tread pattern 10 in accordance with the present invention. The structure 100 includes a rounded-off triangular pedestal 110 defined by a first set of three cylindrical voids 111, a second set of three cylindrical voids 122, and a void ring 133 circumscribing the pedestal (FIG. 5).

The first set of cylindrical voids 111 each have a first spherical expansion 113 at the radially innermost portion of the cylindrical void and a second spherical expansion 115 interposed between the first spherical expansion and the radially outermost portion of the cylindrical void. The radially outermost portion of each cylindrical void 111 is defined by a partially spherical (i.e., hemispherical) expansion 117.

The second set of cylindrical voids 122 each have a first spherical expansion 123 disposed radially away from a radially inner end of the cylindrical void and a second spherical expansion 125 interposed between the first spherical expansion and the radially outermost portion of the cylindrical void. The radially outermost portion of each cylindrical void 122 is defined by a partially spherical (i.e., hemispherical) expansion 127.

FIG. 3 is a radial top view of another example structure 200 in the tread pattern 10 in accordance with the present invention. The structure 200 includes a circular pedestal 210 defined by a first set of three cylindrical voids 211, a second set of three cylindrical voids 222, and a void ring 233 circumscribing the pedestal (FIG. 5).

The first set of cylindrical voids 211 each have a first spherical expansion 213 at the radially innermost portion of the cylindrical void and a second spherical expansion 215 interposed between the first spherical expansion and the radially outermost portion of the cylindrical void. The radially outermost portion of each cylindrical void 211 is defined by a partially spherical (i.e., hemispherical) expansion 217.

The second set of cylindrical voids 222 each have a first spherical expansion 223 disposed radially away from a radially inner end of the cylindrical void and a second spherical expansion 225 interposed between the first spherical expansion and the radially outermost portion of the cylindrical void. The radially outermost portion of each cylindrical void 222 is defined by a partially spherical (i.e., hemispherical) expansion 227.

FIG. 4 is a radial top view of another example structure 300 in the tread pattern 10 in accordance with the present invention. The structure 300 includes a rounded-off three-pronged pedestal 310 defined by a first set of three cylindrical voids 311, a second set of three cylindrical voids 322, and a void ring 333 circumscribing the pedestal (FIG. 6).

The first set of cylindrical voids 311 each have a first spherical expansion 313 at the radially innermost portion of the cylindrical void and a second spherical expansion 315 interposed between the first spherical expansion and the radially outermost portion of the cylindrical void. The radially outermost portion of each cylindrical void 311 is defined by a partially spherical (i.e., hemispherical) expansion 317.

The second set of cylindrical voids 322 each have a first spherical expansion 323 disposed radially away from a radially inner end of the cylindrical void and a second spherical expansion 325 interposed between the first spherical expansion and the radially outermost portion of the cylindrical void. The radially outermost portion of each cylindrical void 322 is defined by a partially spherical (i.e., hemispherical) expansion 327.

The shapes of the pedestals 110, 310 of FIGS. 2 and 4 mitigate twist of the pedestals thereby improving the handling compared with the circular pedestal 210 of FIG. 3. The structures 100, 200, 300 enhance rubber elasticity adjacent the structures and within the structures. As shown in FIGS. 7-10, when the structure 100, 200, or 300 is radially compressed against the road surface 1 and any ice layer 2, this contact area of rubber against road/ice increases (FIG. 9) thereby breaking any water layer and avoiding sliding of the tread portion 10. The difference in temperature of the air within the structures 100, 200, or 300 and the road/ice surface 1, 2 itself may further increase the suction between the structures and the road/ice.

Figure 8:
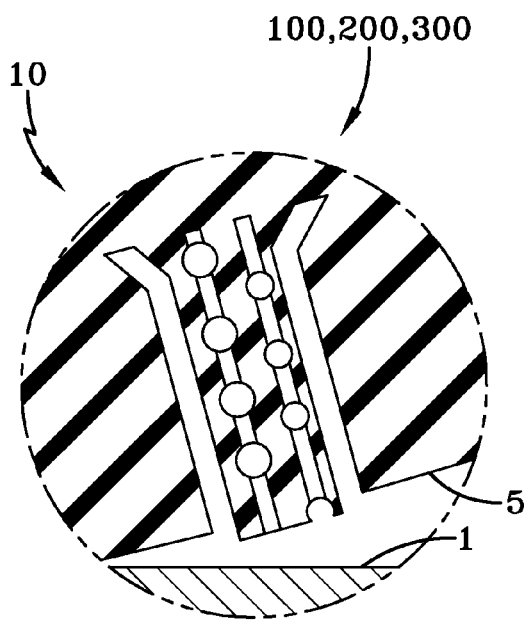
FIG. 8 is a detail view of one structure of FIG. 7.
Figure 9:
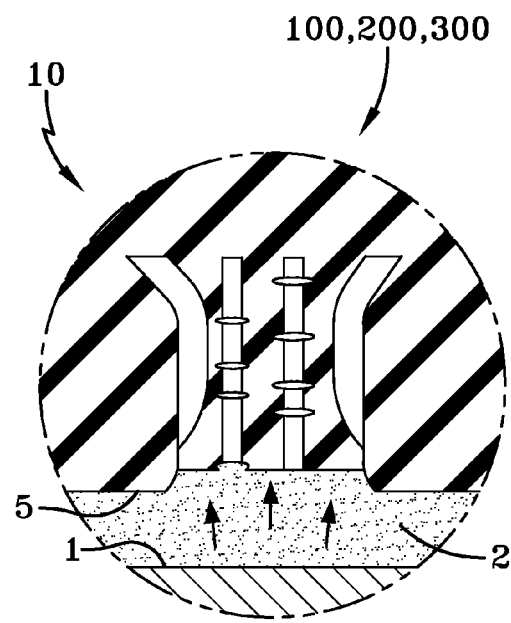
FIG. 9 is a detail view of another structure of FIG. 7.
Figure 10:
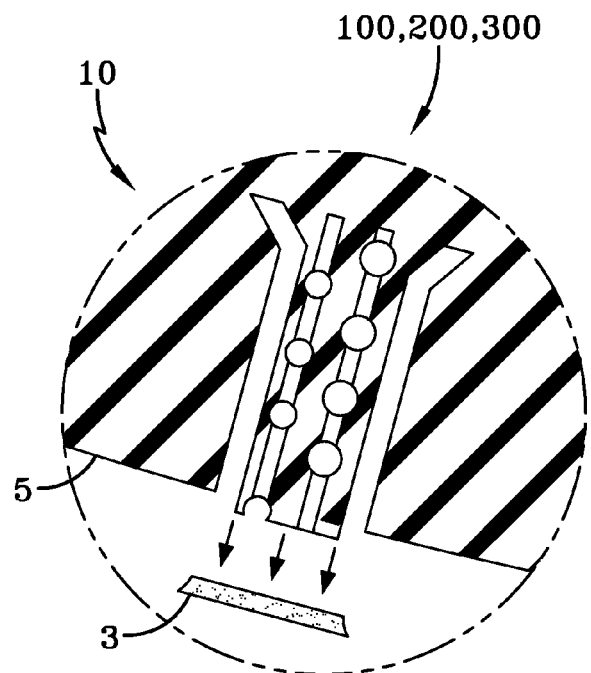
FIG. 10 is a detail view of another structure of FIG. 7.

As shown in FIG. 8, the radially outward force created by the rotating tire may deform the relatively flexible pedestal 110, 210, or 310 to extend beyond the main tread surface 5. When the pedestal 110, 210, or 310 is compressed by the road/ice (FIG. 9), the biting edges of the pedestal may enhance snow traction and the closing off of the voids in the structures may create a suction against an ice surface for enhancing ice traction. When the pedestal 110, 210, or 310 is subsequently released from compression, any portion 3 of snow which was forced into the structure 100, 200, or 300, may be ejected by the elastic expansion of the pedestal (FIG. 10).

The present invention may be embodied in a variety of forms without departing from the spirit or essential characteristics thereof. For example, a variety of configurations and dimensions can be used for the block of the pneumatic tire, and a variety of arrangements and combinations can also be used. Further, the structure and elements of the tread are not limited to those described in the embodiments, and various structures and elements may be used. Therefore, the aforementioned embodiments are in all respects illustrative and not restrictive, the scope of the invention being indicated by the appended claims rather than by the foregoing description and all changes which come within the meaning and range of equivalency of the claims are therefore intended to be embraced therein.

What is claimed is:

1. A structure for a tread pattern of a pneumatic tire, the structure comprising:
    a radially extending pedestal having a rounded-off three-pronged shape;
    a first set of cylindrical voids extending radially through the pedestal;
    a second set of cylindrical voids extending radially through the pedestal; and
    a radially extending rounded off three pronged void ring circumscribing the pedestal,
    the first set including three cylindrical voids disposed in an laterally outward portion of each of the three prongs of the pedestal, the first set of cylindrical voids each have a first spherical expansion at the radially innermost portion of the cylindrical void and a second spherical expansion interposed between the first spherical expansion and the radially outermost portion of the cylindrical void, the radially outermost portion of each of the first set of cylindrical voids being defined by a open-ended hemispherical expansion,
    the second set including three cylindrical voids disposed in an inward portion of each of the three prongs of the pedestal, each of the second set being disposed laterally inward of one of the first set, the second set of cylindrical voids each have a first spherical expansion disposed radially away from a radially inner end of the cylindrical void and a second spherical expansion interposed between the first spherical expansion and the radially outermost portion of the cylindrical void of the second set.

* * * * *